(12) United States Patent  
Omekanda

(10) Patent No.: US 6,593,720 B2  
(45) Date of Patent: Jul. 15, 2003

(54) METHOD OF OPTIMIZING PERFORMANCE PARAMETERS OF A SWITCHED RELUCTANCE MOTOR

(75) Inventor: Avoki M. Omekanda, Rochester, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/757,040

(22) Filed: Jan. 9, 2001

(65) Prior Publication Data

US 2002/0121876 A1 Sep. 5, 2002

(51) Int. Cl.[7] .................................................. H02P 1/46
(52) U.S. Cl. ....................... 318/701; 318/799; 318/254; 318/138; 318/439; 318/434
(58) Field of Search ................................. 318/254, 439, 318/701, 138, 433, 434, 799

(56) References Cited

U.S. PATENT DOCUMENTS

| | | | | |
|---|---|---|---|---|
| 5,012,171 A | * | 4/1991 | Sember ........................ 318/696 |
| 5,532,567 A | * | 7/1996 | Iwasaki et al. ............. 318/701 |
| 5,589,752 A | * | 12/1996 | Iwasaki et al. ............. 318/701 |
| 5,796,226 A | * | 8/1998 | Ookawa et al. ............. 318/254 |
| 6,008,561 A | * | 12/1999 | Tang .......................... 310/180 |
| 6,051,942 A | * | 4/2000 | French ....................... 318/254 |

* cited by examiner

Primary Examiner—Rita Leykin  
(74) Attorney, Agent, or Firm—Margaret A. Dobrowitsky

(57) ABSTRACT

Described is a method of optimizing performance parameters of a switched reluctance motor comprising ascertaining the parameters of at least three objectives of the motor selected from the group consisting of firing angles, power on the shaft of the motor, drive efficiency, torque ripple coefficient, output torque, torque per rms current per cycle, torque per mean ampere, energy consumption, phase target current level, hysteresis band size, duty cycle, DC voltage and zero-volt control loop;

plotting the parameters on an x-y or x-y-z chart; and mapping all of the parameters on to one chart and thereby ascertaining the optimum performance of the at least three parameters.

1 Claim, 6 Drawing Sheets

METHOD OF OPTIMIZING PERFORMANCE PARAMETERS OF A SWITCHED RELUCTANCE MOTOR

FIELD OF THE INVENTION

The present invention pertains to the optimization of switched reluctance (SR) machines by determining various performance parameters and analyzing those parameters to optimize the operation of the machine.

BACKGROUND OF THE INVENTION

The present invention relates to generators as well as to motors. To simplify the description, what follows pertains to a motor with the understanding invention also relates to generators. A switched reluctance (SR) motor comprises a ring shaped stator that has a plurality of pole positions defined by wire coils and disposed in a circular arrangement, a rotor disposed rotatably in an inner space defined by the stator having pole protrusions that face the pole portions of the stator. Normally, the rotor is an iron core formed by stacking iron plates. When supplied with electricity, the wire coils become magnetized together with the pole portions to attract the pole protrusions of the rotor. The rotor is continuously rotated by selectively distributing electric current to the coils.

Switched reluctance motors generate torque by utilizing a magnetic attractive force that acts between the rotor and the stator when the coils are magnetized. Conventional SR motors normally suffer vibration problems. The magnetic attractive force acting between the stator and the rotor is generally circumferential in direction and quickly increases as the rotor rotates during a cycle of the electric current distribution (to selected coils) and then abruptly terminates at the time of switching the current distribution (to other coils). This on-off cycle of magnetic attractive force causes the rotor and the stator to vibrate in generally circumferential directions. See U.S. Pat. No. 5,747,912.

A conventional switched reluctance motor is shown in FIG. 32 of U.S. Pat. No. 5,880,549 which comprises a four pole rotor where in each of the poles protrudes cross-wisely around the rotating shaft and a six-pole stator arranged around the rotor, each of the protruding poles of the stator having a concentrating winding. The current passes through the winding is unidirectional and includes a distorted wave current and direct current component.

Other switched reluctance motors are described in U.S. Pat. Nos. 6,028,385, 6,014,012, 6,002,233, 5,945,761 and 5,900,712; all of which are here by incorporated by reference.

In the field of electric machines of the Switched Reluctance type, it is well known that the machine performance (efficiency, output torque, torque ripple, etc.) is a function of when the current is turned-on and turned-off. (So-called turn-on and turn-off angles). It is also well known that the best angles will be different depending on speed, voltage, etc. Therefore others have looked for ways to take advantage of this to optimally design Switched Reluctance Motors (SRM). So far, however attempts have been confined to the following:

1. Approach based on optimization of one function at a time. [1–2]; This consists of an analytical or numerical optimization of one performance quality (efficiency, output torque, torque ripple, torque per ampere, energy, etc.) at a time. Because of the complexity of the physics and mathematics involved, however, people have only optimized with one parameter (say, efficiency) with at the most minor fine-tuning around the chosen point to improve together parameters (reduce torque ripple for instance). For example, reference (1) maximizes the Torque per Ampere only while reference (2) minimizes the energy consumption, by means of the root-mean-square (rms) phase current.

References:
[1] B. Fahimi et al. "Self-Turning of Switched Reluctance Motors for Optimized Torque per Ampere at all Operating Points". Proceedings of IEEE Applied Power Electronics Conference, APEC '98, pp. 778–783, Feb. 1998.
[2] Ph. C. Kjaer et al. "A New Energy control Strategy for Switched Reluctance Motors". IEEE Transactions on Industry Applications, Vol. 31, No. 5, pp. 1088–1095, Sep./Oct. 1995.

2. Empirical approach (Testing of an existing prototype); Because of measurement limitations, one has essentially optimized for single performance quantity. This method requires that a prototype has already been built. In published literature, people usually do not specify explicitly that an empirical approach was used. Specific statements giving numbers without theoretical justification often mean that this kind of approach was used [3].

Reference:
[3] K. M. McLaughlin, M. W. Gluch. "Method and Apparatus for Controlling an Electric Assist Steering System using Two-dimensional Interpolation for Current Commands". U.S. Pat. No. 5,475,289. Dec. 12, 1995.

It is an object of the present invention to provide a method of optimizing the performance parameters for a switched reluctance motor by obtaining the parameters of at least three objectives of the motor, plotting the parameters on a two or three dimensional chart and then mapping all of the parameters onto one chart.

SUMMARY OF THE INVENTION

Described is a method of optimizing performance parameters of a switched reluctance motor comprising ascertaining the parameters of at least three objectives of the motor, each as a function of at least one parameter.

Described is a method of optimizing performance parameters of a switched reluctance motor comprising ascertaining the parameters of at least three objectives of the motor selected from the group consisting of firing angles, power on the shaft of the motor, drive efficiency, torque ripple coefficient, output torque, torque per rms (root-mean-square) current per cycle, torque per mean ampere, energy consumption, phase target current level, hysteresis band size, duty cycle, DC voltage and zero-volt control loop, and the like;

plotting the parameters on an x-y (2 Dimension) or x-y-z chart (3 Dimension); and mapping all of the desired parameters on to one chart and thereby ascertaining the optimum performance of the at least three parameters.

Also described is a method of operating a switched reluctance motor by ascertaining the optimum performance parameters as described above and operating the switched reluctance motor utilizing those parameters.

DETAILED DESCRIPTION OF THE PREFERRED EMBODIMENT

Figure 1A:
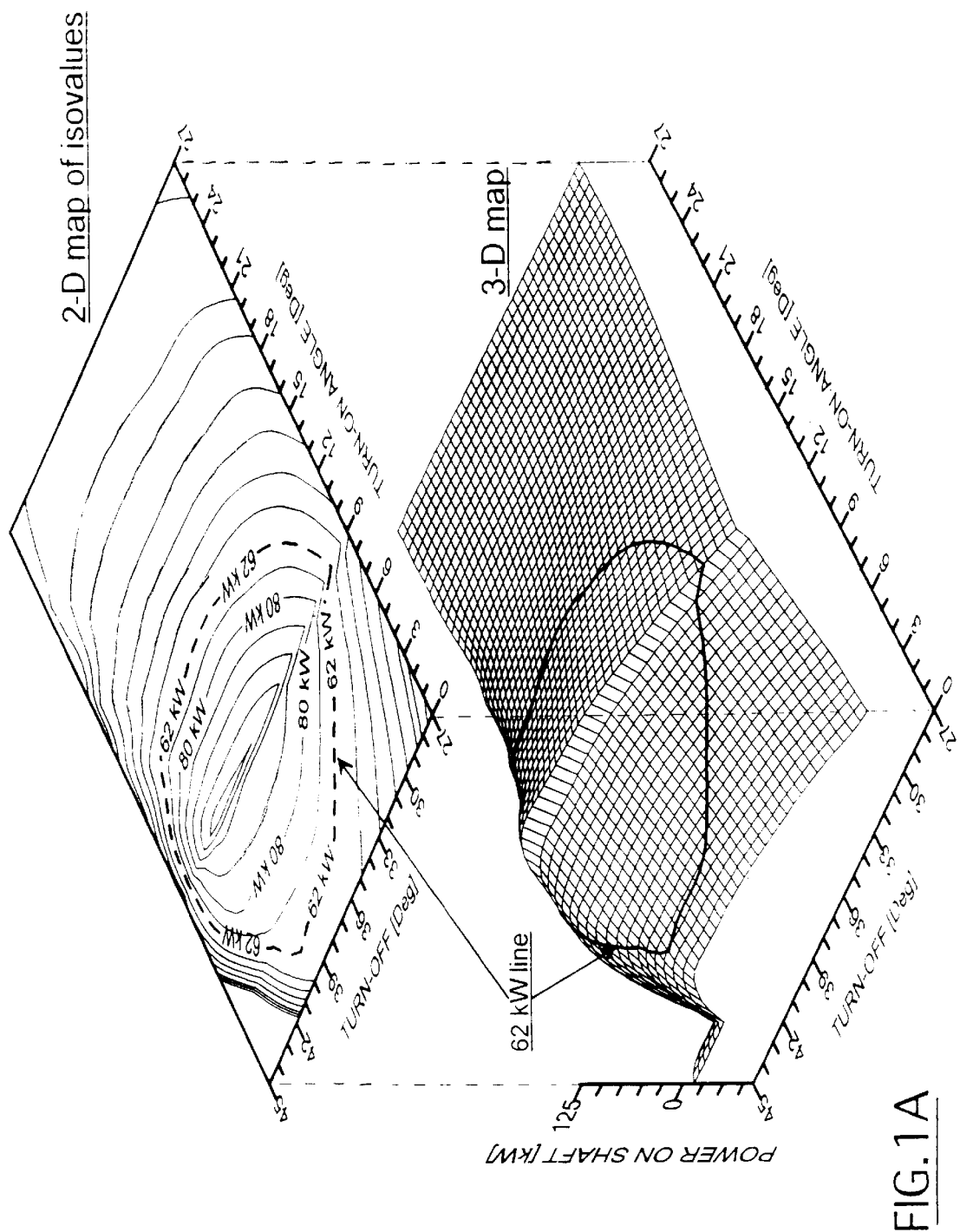
FIG. 1A plots the mechanical output power map of a given switched reluctance (SR) machine at a constant motor speed of 16,200 r.p.m. (revolutions per minute) as a function of firing angles (turn-on and turn-off).

This invention presents a new technique for the search of optimum control parameters of a switched reluctance drive. In the specific example described herein, the firing angles (turn-on and turn-off) are chosen that achieve high drive efficiency with lowest torque ripple in the entire Torque (Power)-Speed operation of a Switched Reluctance Motor drive. The technique is based on mapping performance quantities as functions of turn-on and turn-off angles at each selected motor speed. The bounds of the control angles are functions of geometrical parameters of the SR motor (SRM). For a given mechanical output required from a given SRM drive (torque, speed), there are several possible sets of control parameters. But for each of these sets of parameters, the efficiencies, the shaft torque waveforms (torque ripple) and other performance quantities will vary.

The method is explained with efficiency and torque ripple as key objectives. It may be used with other goals including, but not limited to: output torque, torque per rms ampere, torque per mean ampere, energy consumption, etc.

The method is also applicable to a switched reluctance machine operating as a generator.

The method can be used with three or more key objectives at a time.

The method permits finding the optimum firing angles (turn-on and turn-off) as control parameters. It could also be used for finding other control parameters including, but not limited to phase target current level, hysteresis band size, duty cycle, DC voltage level, zero-volt control loop, and the like.

The new Technique is based on the following principles:

(a) Mapping SR drive performance quantities as functions of turn-on and turn-off angles at any selected motor speed.

(b) Superposition of all generated maps in order to create a global final map for the selected motor.

The intersections of curves relative to all considered performance quantities give the optimums of the desired quantities and the corresponding optimum control parameters (firing angles, phase target current level. hysteresis band size, duty cycle, DC voltage level, zero-volt control loop, etc.)

This invention provides a new technique for the search of optimum firing angles (turn-on and turn-off) achieving high drive efficiency with lowest torque ripple in the entire Torque (Power)-Speed operation plane of a Switched Reluctance Motor drive. The technique is based on mapping performance qualities as functions of turn-on and turn-off angles at each selected motor speed (See Figs.). The bounds of the control angles are functions of geometrical parameters of the SR motor. For a given mechanical output required from a given SRM drive (torque, speed), there are several possible sets of control parameters. But for each of these sets of parameters, the efficiencies, the shaft torque waveforms (torque ripple) and other performance qualities will vary.

Let us consider a given SRM drive and then compute its performance maps (Figs.) at a selected motor speed equal to 16200 r.p.m., for example.

The present invention shows how to best select among many firing angles that provide the desired output power (62 kW in this example). Assume, for instance, that efficiency and torque ripple are important for that particular application. These two parameters, efficiency and torque ripple, are calculated for each operating point represented on the 3-D contour shown on FIG. 1A. The values of efficiency and torque ripple (the latter being represented by a so-called Torque Ripple Coefficient defined latter) for every point on the 3-D contour and then projected onto a 2-D plan as map of isovalues. FIG. 1B shows such projections for the torque ripple coefficient. The 62-kW points are also shown as a dotted line. Points inside the 62-kW line correspond in this case to power levels larger than 62 kW, and were projected downward to produce this plot. Likewise points outside the 62-kW line correspond to power levels smaller than 62 Kw, and were projected upward. FIG. 1C is similar, with drive efficiency data.

A subsequent step in choosing operating parameters consists of superposing the various desirable 2-D maps. FIG. 1D in this example superimposes the maps plotted as FIGS. 1B and 1C. It also includes the 62-kW power level as a broken line. This superimposition shows in particular that some operating points, such as point P (turn-on angle=12°, turn-off angle=31°) does produce the desired 62 kW output, but an efficiency of less than 96% and a torque ripple coefficient of approximately 1.50 (150%). The points between points R and Q on the 62-kW line, by contrast, generate the same power but with an efficiency of more than 96% and a torque ripple coefficient between 75% and 100%. In this particular example where efficiency and torque ripple are the most desirable quantities, the chosen operating point should be chosen between points R and Q.

A further refinement is possible at this point. Choosing a point between R and Q may be performed by fine tuning the plot to target, for instance, the highest possible efficiency on that segment. Alternatively, an additional map of isovalues may be superimposed on top of the present two, for instance to minimize the phase target current level.

Figure 1B:
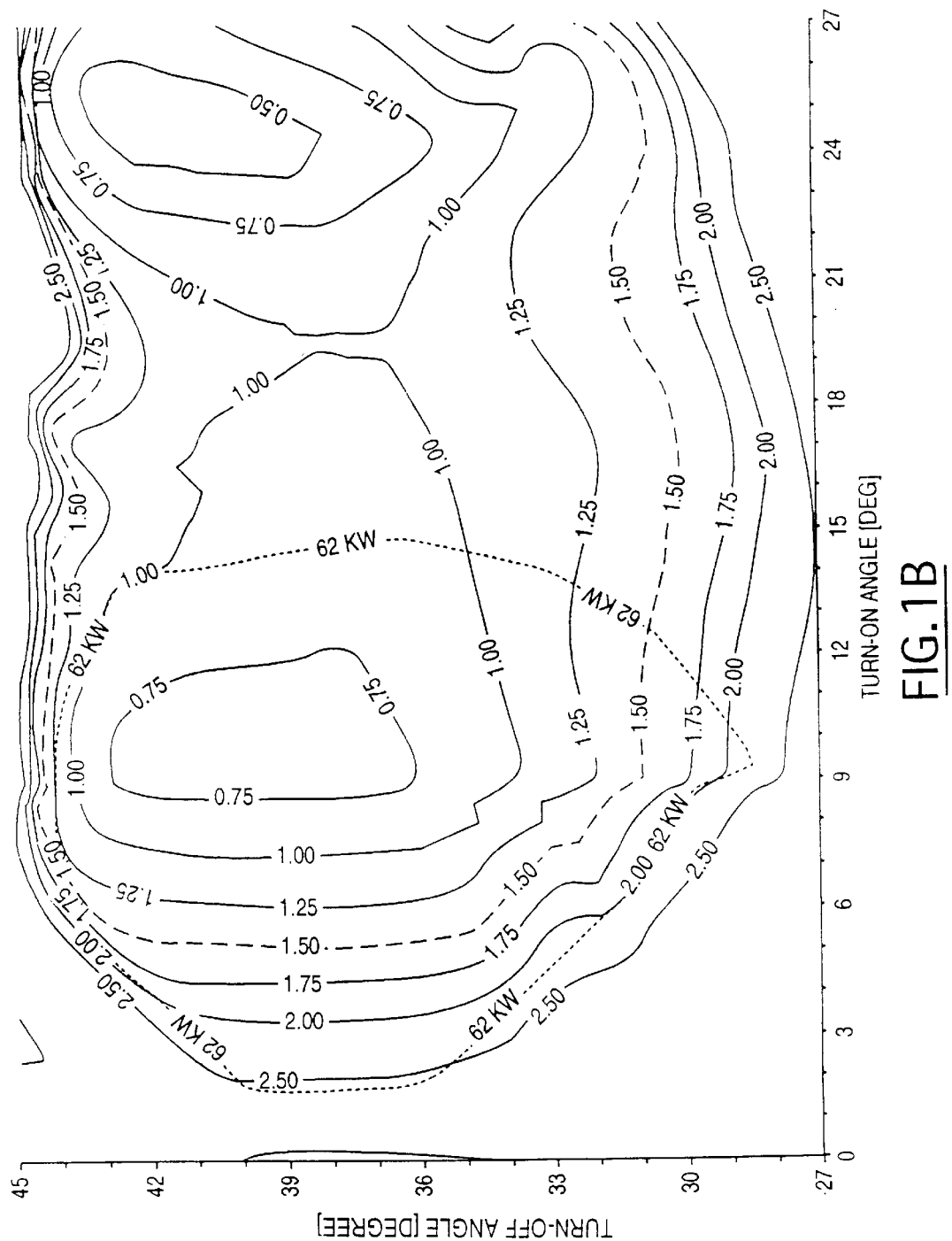
FIG. 1B is a plot of the switched reluctance machine torque ripple coefficient map at a constant motor speed of 16,200 r.p.m. as a function of firing angles (turned on and turned off) (vehicle axle speed equals 1350 r.p.m.).
Figure 1C:
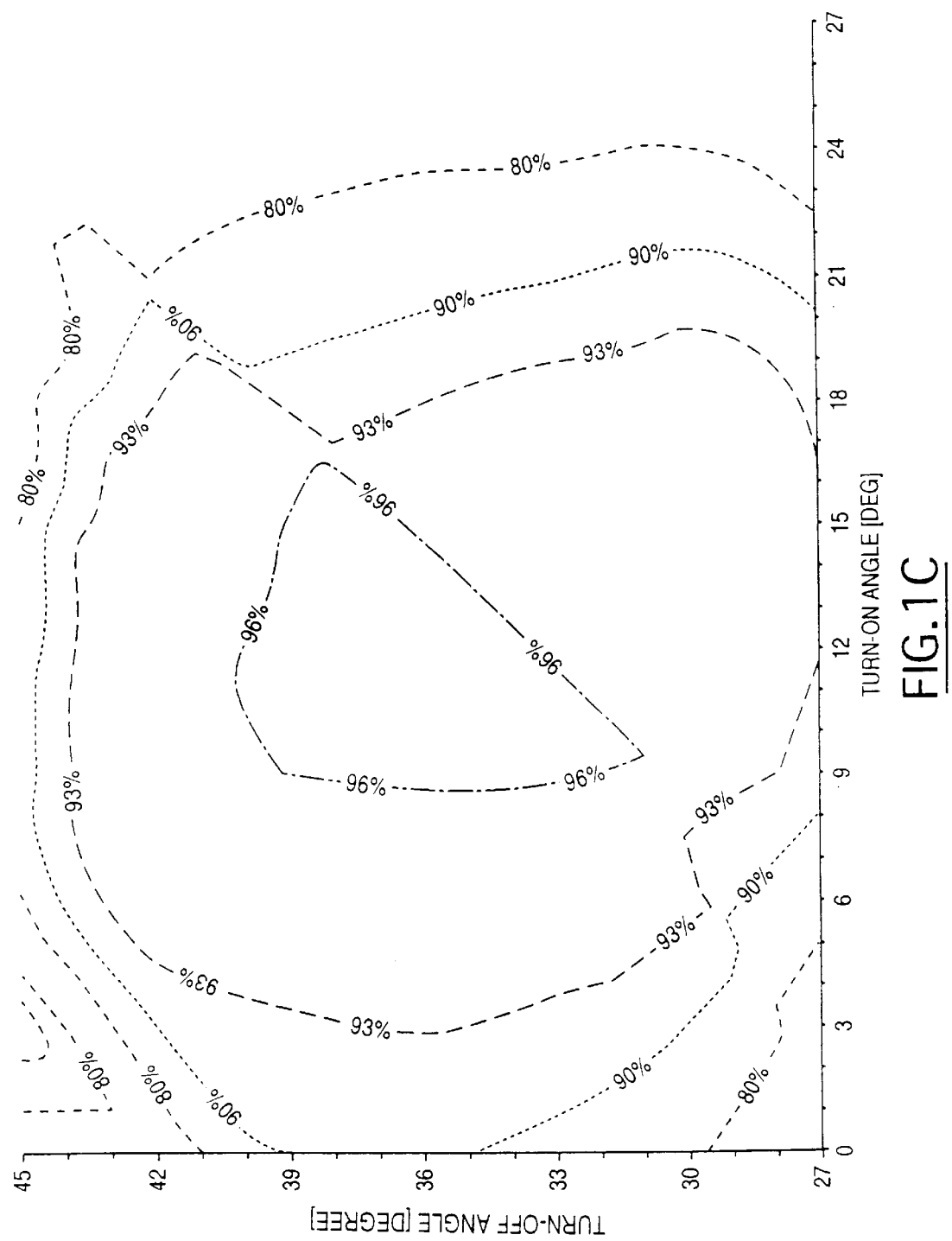
FIG. 1C is a plot of a switched reluctance machine efficiency map at a constant motor speed of 16,200 r.p.m. as a function of firing angles turn on and turn off (vehicle axle speed equals 1350 r.p.m.).
Figure 1D:
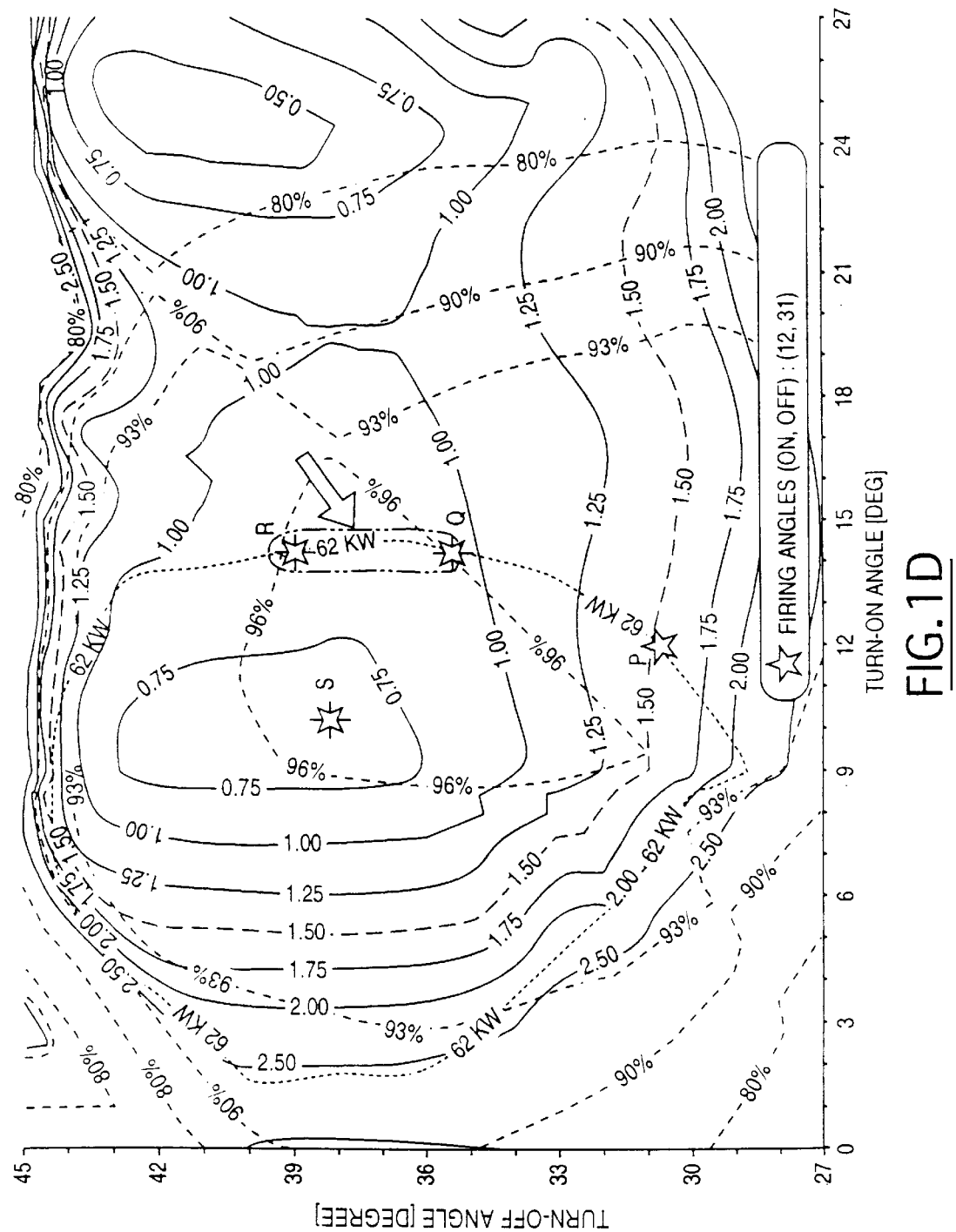
FIG. 1D is a two dimensional plot of the parameters depicted in FIGS. 1A, 1B and 1C; the plot shows the optimum firing angles for the vehicle axle operation with maximum drive efficiency and minimum torque ripple (at 62 kW, 1350 r.p.m.).

The Mechanical Output Map on FIG. 1A (the upper portion) shows that a multitude of combinations of turn-on and turn-off angles can engender 62 kW out of the considered motor.

FIG. 1D shows also that the considered SRM drive can deliver more than 62 kW at 16200 r.p.m. with a torque tipple content less than 75%. Such operating point is illustrated by point S on FIG. 1D.

The method can be used to optimize a drive in any number of ways. For instance, if a specification calls for a torque ripple coefficient of at most 75%, the 3-D map shown in FIG. 1A would now plot torque ripple coefficient on the z-axis (instead of power on the shaft as shown on the figure). Plots of, for instance, isovalues of power and isovalues of efficiency would then be drawn in order to, say, maximize output power and efficiency at the desired level of at the most 75% torque ripple coefficient.

This example used two control parameters, such as turn-on and turn-off angles, as control parameters. Other control parameters, such as phase current target level or zero-voltage control loop (defined later) were kept constant during the calculations leading to the plotting of FIGS. 1A, B and C. If it is desirable to include another parameter, say, phase current target level, along with turn-on and turn-off angles, the present method can be used as follows.

A first option consists of building a 4-D map of power versus turn-on angle, turn-off angle and phase current target level. Such a 4-D map could not be visualized but could be used by known mathematical algorithms to search for optimum. This method, sometimes, however, yields a local optimum.

A second option is to draw three maps like the FIG. 1D map, plotting isovalues in terms of (turn-on; turn-off); (turn-on; phase current), (turn-off; phase current), and using the three plots to visually choose the optimum.

It should also be appreciated than the same drive can use several optimum points depending on the outside conditions. For instance, different maps may be used depending on ambient temperature. Or, in the case of an automobile generator, depending on the battery state-of-charge whereby, again as example, low torque ripple may be temporarily set aside as a desirable quantity, when the battery state-of-charge is low in favor of maximum output.

This technique was successfully used off-line for determining optimum firing angles in two SRM drive prototypes intended for Electric Vehicle Propulsion.

Figure 2A:
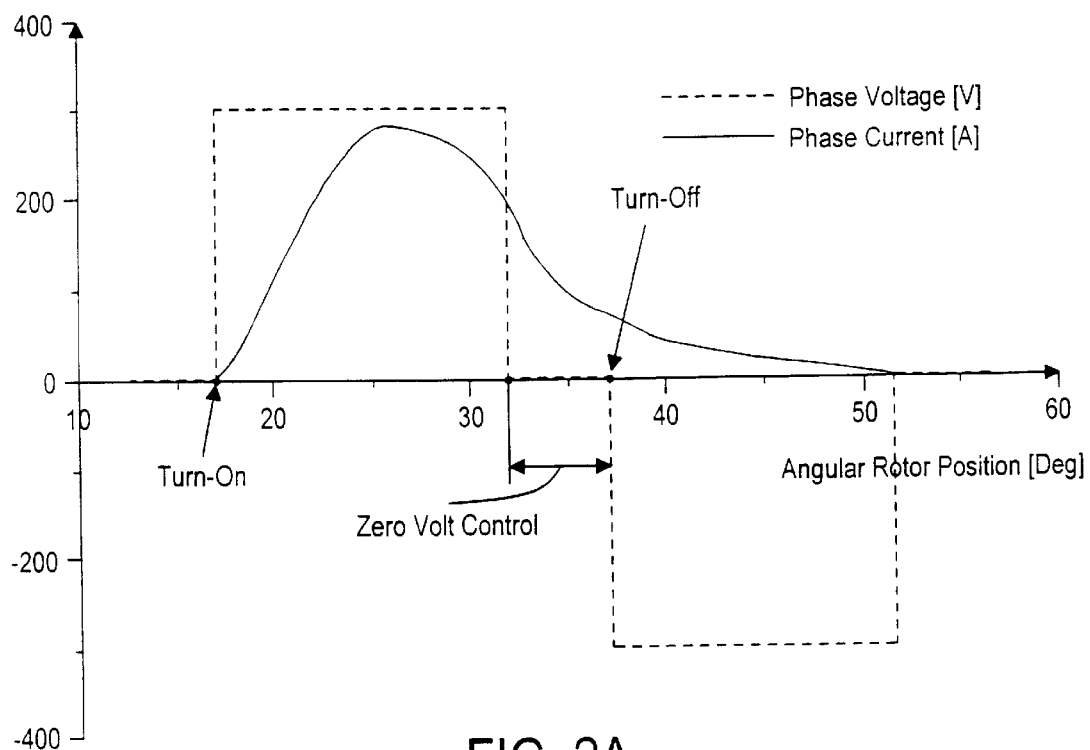
FIG. 2A is a time dimensional plot of SR motor in a single pulse mode of operation.

By firing angles is meant: the turn-on angle and turn-off angle (see FIG. 2A). Turn-on angle is the value of rotor position at which a machine phase is energized. At this position, a positive value of voltage is applied across a machine phase winding (FIG. A).

Figure 2B:
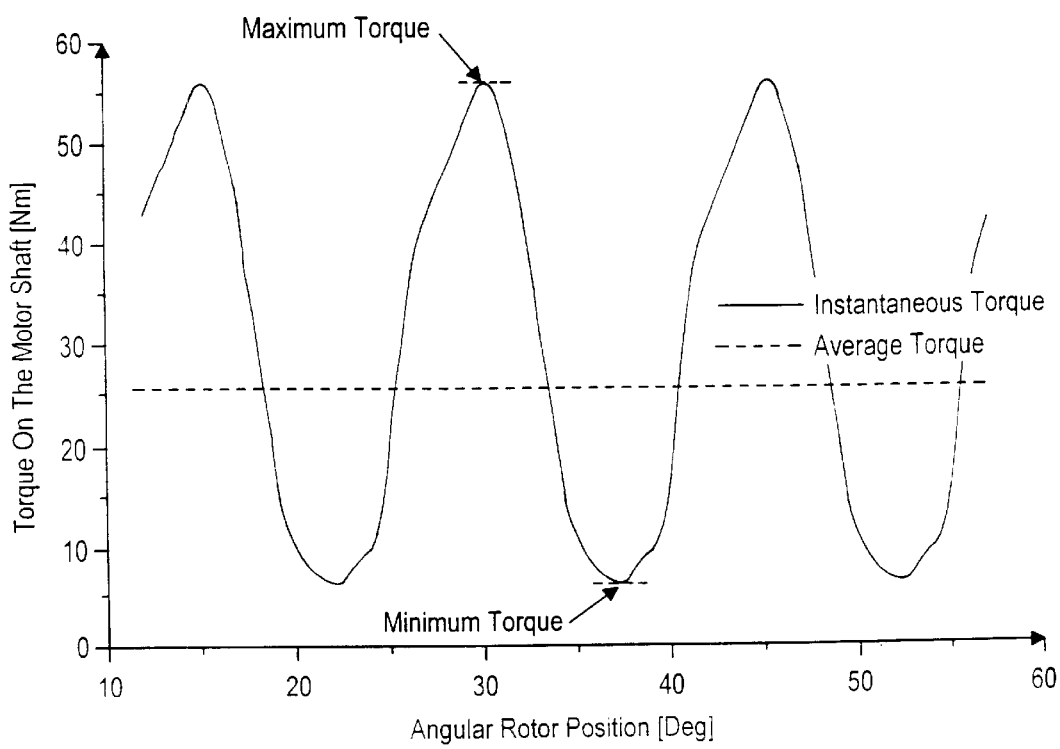
FIG. 2B is a time dimensional plot of SR motor in a Single Pulse mode of operation.

By power on the shaft is meant: the mechanical power on the machine shaft. It means the product "Average torque× speed". The average torque is the average value of the motor instantaneous torque over the machine angular period of operation (FIG. 2B). For a switched reluctance machine, the angular period equals to the rotor pole pitch (360 degrees divided by the number of rotor poles).

By drive efficiency is meant:

$$\frac{\text{Power on the shaft}}{\text{Electrical power feeding the drive}}.$$

The electrical power feeding the drive equals the product of DC voltage applied to the drive time the average value of the electrical current absorbed by the drive. Also, in case of an SR generator (as opposed to motor), the drive efficiency is the reverse of the above.

By torque ripple coefficient is meant:

$$K_t = \frac{\text{Maximum torque} - \text{Minimum torque}}{2 \times \text{Average torque}}$$

over an angular period of the motor (See FIG. 2B).

By output torque is meant: the average torque on the motor shaft.

By torque per mean ampere is meant:

$$\frac{\text{Average torque}}{\text{Phase mean current}}.$$

A phase mean current is the average value of the phase instantaneous current over an angular period of operation.

By energy consumption is meant: electrical power (voltage×current) consumed by the drive over the operation time (for an SR machine working as a motor).

By phase target current level is meant: the value of maximum current that can be reached into a motor phase. On the other hand, if the current flowing into a phase is lower than the target current level over an angular period, the machine is in a Single Pulse mode of operation (FIGS. 2A–2B). If the current tends to go over the target current level (this can happen only when the rotor position is in between the turn-on angle and the turn-off angle), the machine enters a Current Control mode of operation (FIG. 1C).

Figure 2C:
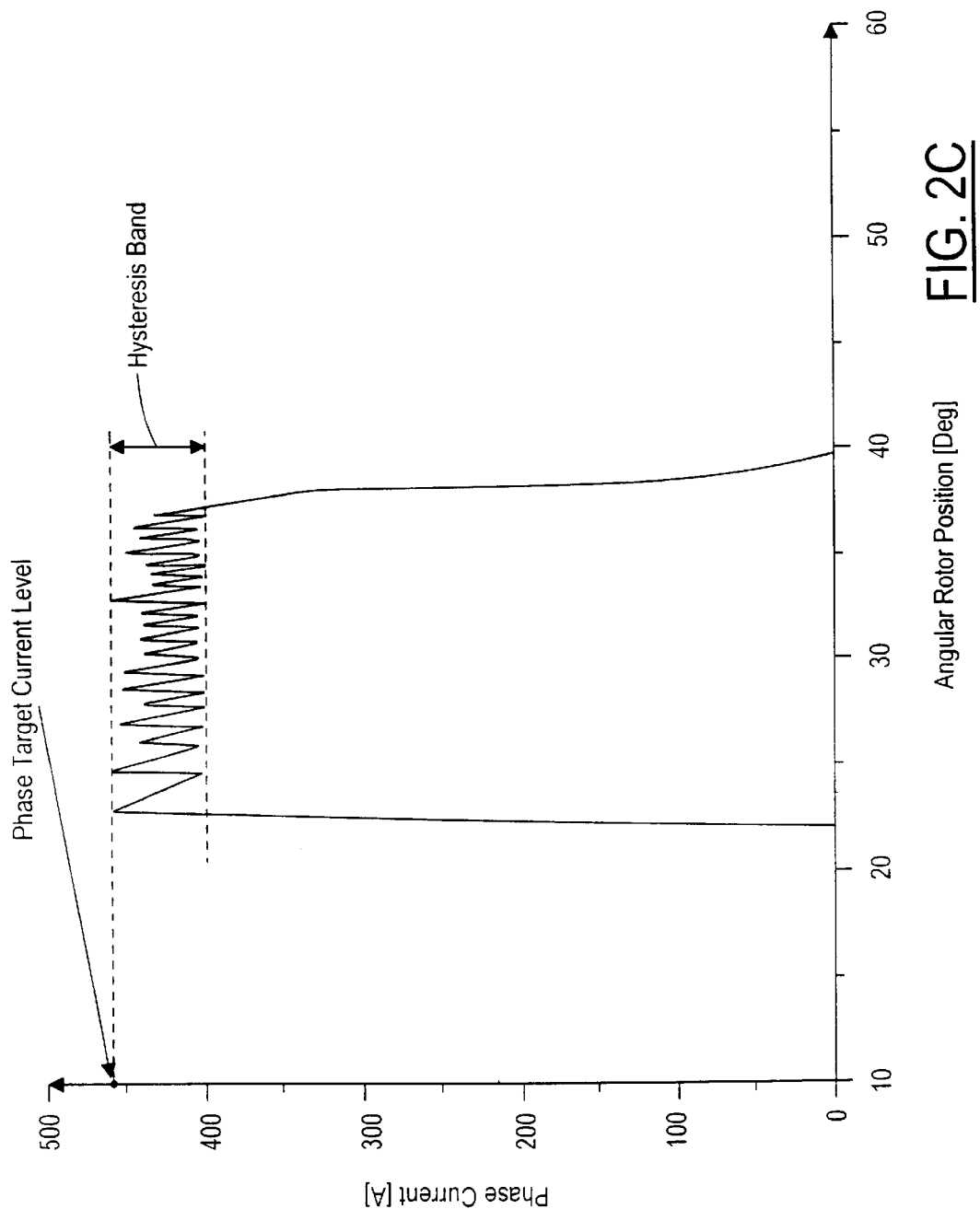
FIG. 2C is a time dimensional plot of SR motor in a Current Control mode of operation.

By hysteresis band size is meant: the interval in which the electrical current flowing into a motor phase is maintained during a current control mode of operation (FIG. 2C).

By duty cycle is meant: the coefficient of reduction of a DC voltage due to a voltage chopping.

By zero volt control loop is meant: the angular interval in which the applied voltage in a motor phase equals to zero volt (FIG. 2A).

The invention has been described in an illustrative manner, and it is to be understood that the terminology which has been used is intended to be in the nature of words of description rather than of limitation.

Obviously, many modifications and variations of the present invention are possible in light of the above teachings. Therefore, it is to be understood that within the scope of the appended claims the invention may be practiced otherwise than as specifically described. Moreover, the reference numerals are merely for convenience and are not intended to be in any way limiting.

What is claimed is:

1. A method of optimizing performance parameters of a switched reluctance motor comprising:

ascertaining optimum performance of objective parameters of at least three objectives of the motor;

each as a function of at least one control parameter, said objective parameters of at least three objectives of the motor selected from the group consisting of turn-on angle, turn-off angle, power on the shaft of the motor, drive efficiency, torque ripple coefficient, output torque, torque per rms (root-means-square) current per cycle, torque per mean ampere, energy consumption, phase target current level, hysteresis band size, duty cycle, DC voltage and zero-volt control loop;

plotting the parameters on an x-y or x-y-z chart;

mapping all of the desired parameters on to one chart as a function of the at least one control parameter and thereby ascertaining the optimum performance of the at least three objective parameters with respect to the at least one control parameter; and the objective parameters include torque ripple coefficient drive efficiency and power in the shaft of the rotor and the at least one control parameter comprises turn-on angle and turn-off angle.

* * * * *